(12) United States Patent
Hasegawa et al.

(10) Patent No.: US 9,547,791 B2
(45) Date of Patent: Jan. 17, 2017

(54) IMAGE PROCESSING SYSTEM, IMAGE PROCESSING APPARATUS, IMAGE PROCESSING METHOD, AND PROGRAM

(71) Applicant: SONY CORPORATION, Tokyo (JP)

(72) Inventors: Yuichi Hasegawa, Tokyo (JP); Jun Yokono, Tokyo (JP); Keisuke Yamaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/669,510

(22) Filed: Mar. 26, 2015

(65) Prior Publication Data

US 2015/0199563 A1   Jul. 16, 2015

Related U.S. Application Data

(63) Continuation of application No. 12/938,559, filed on Nov. 3, 2010, now Pat. No. 9,020,210.

(30) Foreign Application Priority Data

Nov. 11, 2009   (JP) .................................. 2009-257666

(51) Int. Cl.
*G06K 9/00* (2006.01)
*G06T 7/00* (2006.01)
(Continued)

(52) U.S. Cl.
CPC ..... *G06K 9/00369* (2013.01); *G06F 17/30247* (2013.01); *G06K 9/6201* (2013.01); *G06T 7/004* (2013.01); *G06T 11/60* (2013.01)

(58) Field of Classification Search
CPC .................... G06T 2207/30196; G06T 7/0042; G06T 7/2046; G06T 7/004; G06T 7/0044; G06T 11/60; G06T 17/30247; G06K 9/00362; G06K 9/00369; G06K 9/3241; G06K 9/0021; G06K 9/00228; G06K 9/6201

See application file for complete search history.

(56) References Cited

U.S. PATENT DOCUMENTS

| 6,031,934 A * | 2/2000 | Ahmad et al. ................. 382/154 |
| 8,311,954 B2 * | 11/2012 | Ning et al. ...................... 706/12 |
| 2007/0024710 A1 * | 2/2007 | Nakamura ..................... 348/143 |

FOREIGN PATENT DOCUMENTS

| JP | 2004-302992 | 10/2004 |
| JP | 2005-136841 | 5/2005 |

(Continued)

OTHER PUBLICATIONS

Lee et al "A Pose Descriptor of Human Objects and Content-Based Retrieval by Pose Description", ITU Study Group 16—BDEO Coding Experts Group—ISO/IECC MPEG & ITU-T VCEG (ISO/IEC JTC1/SC29?WG11 and ITU-T SG16 Q6), published Oct. 1998, pp. 1-7.*

(Continued)

*Primary Examiner* — Edward Park
(74) *Attorney, Agent, or Firm* — Paratus Law Group, PLLC

(57) ABSTRACT

An image processing system includes a storing section that stores a database in which specific pose data representing each of specific poses of a human, and effect manipulation data specifying each of manipulations applied to an image are registered in association with each other, a human region detecting section that detects a human region that is a region where a human appears in an image on which to perform image processing, a human pose recognizing section that recognizes a pose of the human in the human region detected by the human region detecting section, a matching section that finds the specific pose data matching the pose recognized by the human pose recognizing section, by referencing the database, and a manipulating section that applies a manipulation to the image on the basis of the effect manipulation data associated with the specific pose data found by the matching section.

7 Claims, 15 Drawing Sheets

(51) Int. Cl.
     *G06T 11/60*     (2006.01)
     *G06F 17/30*     (2006.01)
     *G06K 9/62*      (2006.01)

(56) References Cited

FOREIGN PATENT DOCUMENTS

| JP | 4245433 | 1/2009 |
|---|---|---|
| WO | WO 03/100703 | 12/2003 |
| WO | WO 03/100703 A2 * | 12/2003 |
| WO | WO 2009/094661 | 7/2009 |

OTHER PUBLICATIONS

Office Action from the Japanese Patent Office related to Application No. 2009-257666; dated Dec. 17, 2013 (Japanese language only).
Lee et al., A Pose Descriptor of Human Objects and Content-Based Retrieval by Pose Description.; ITU Study Group 16—BDEO Coding Experts Group—ISO/IEC MPEG & ITU-T VCEG (ISO/IEC JTC1/SC29/WG11 and ITU-T SG16 Q6), published Oct. 1998. pp. 1-7.
European Search Report issued Jul. 20, 2011 in corresponding European patent application No. EP 10 18 8009.

* cited by examiner

FIG. 2
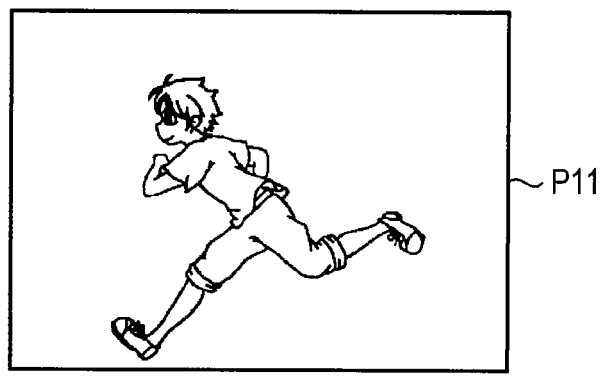
P11
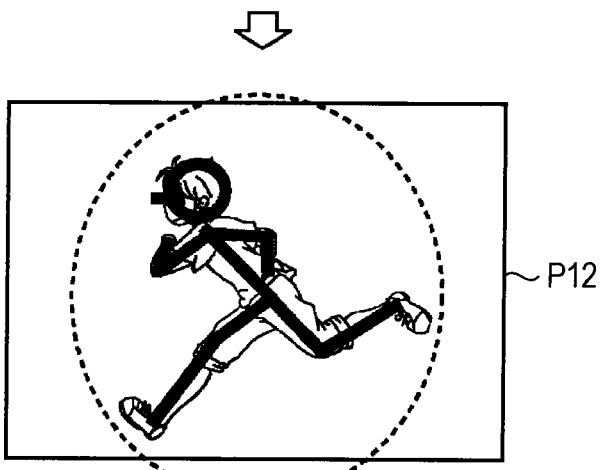
P12
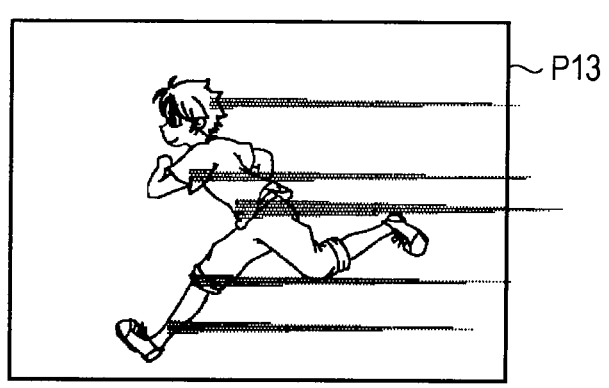
P13

FIG. 5
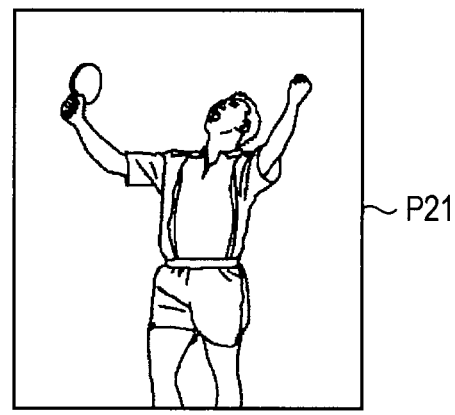
P21
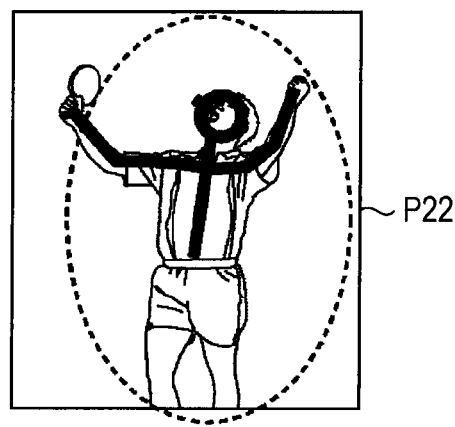
P22
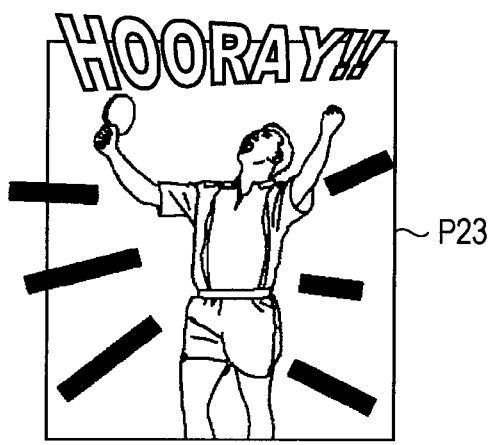
P23

FIG. 6
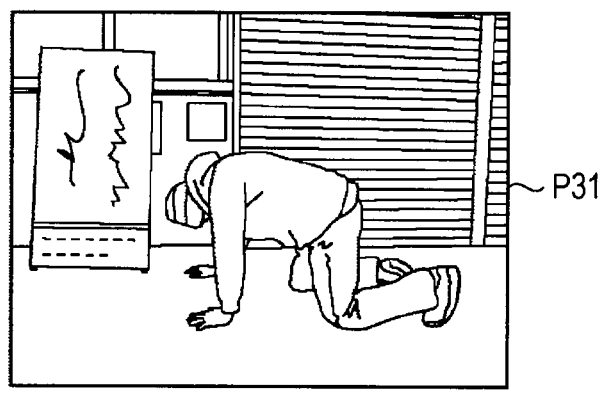
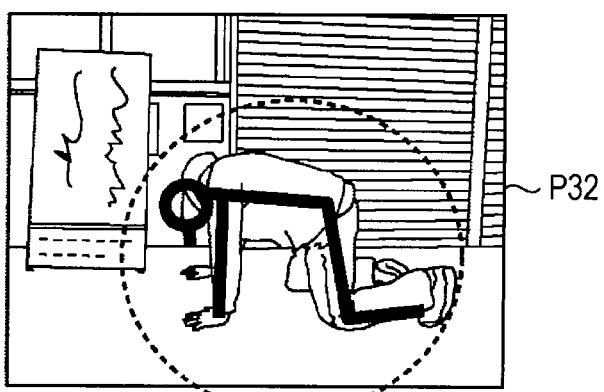

FIG. 9
P41
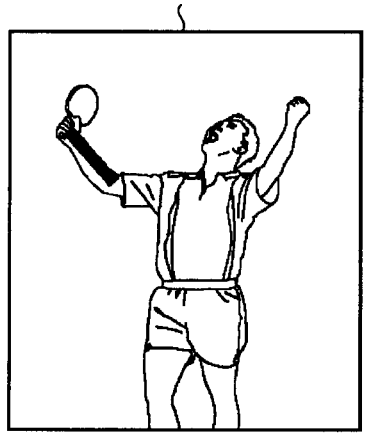
P42
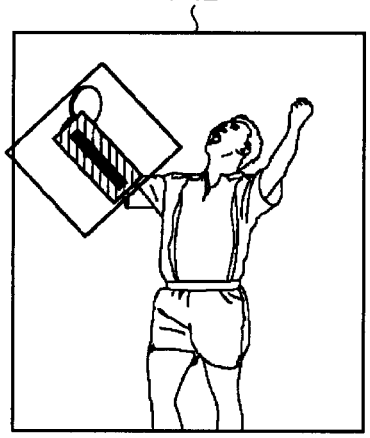
αM11
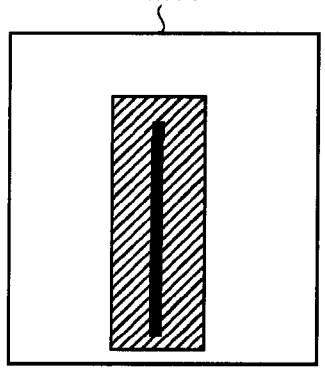
P43
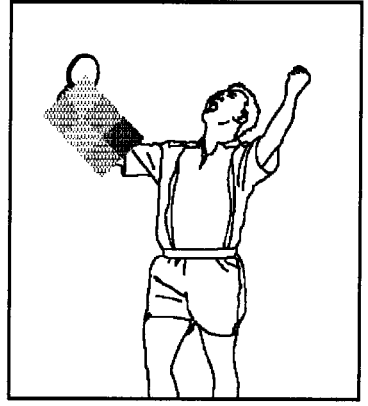
f11
| 0.111 | 0.111 | 0.111 |
|---|---|---|
| 0.111 | 0.111 | 0.111 |
| 0.111 | 0.111 | 0.111 |

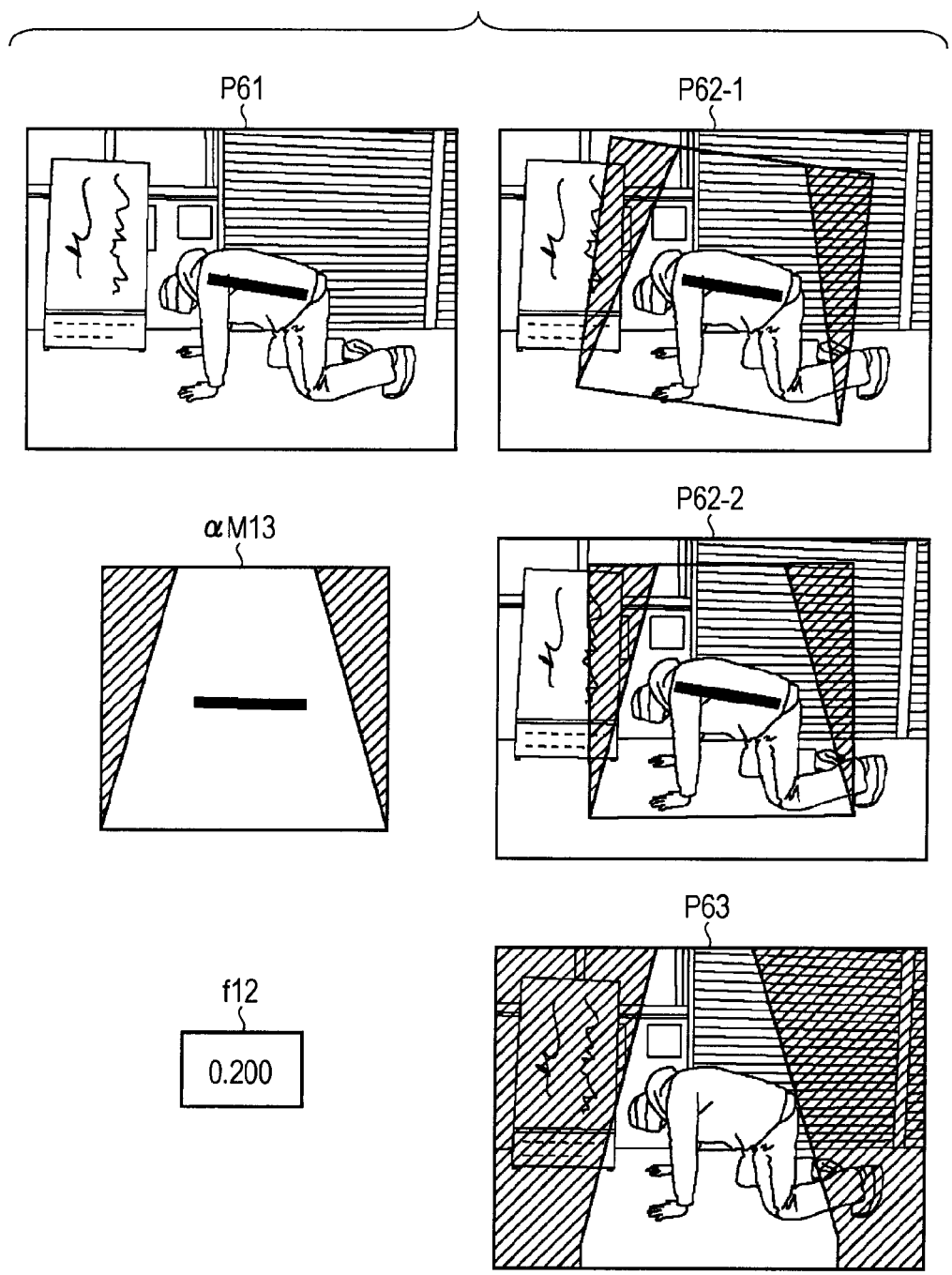

IMAGE PROCESSING SYSTEM, IMAGE PROCESSING APPARATUS, IMAGE PROCESSING METHOD, AND PROGRAM This is a continuation of U.S. patent application Ser. No. 12/938,559, filed Nov. 30, 2010, which is based upon and claims the benefit of priority under 35 U.S.C §119 to Japanese application No. 2009-257666 filed in the Japanese Patent Office on Nov. 11, 2009, the entire content of all of which are incorporated herein by reference.

BACKGROUND OF THE INVENTION

1. Field of the Invention

The present invention relates to an image processing system, an image processing apparatus, an image processing method, and a program, in particular, an image processing system, an image processing apparatus, an image processing method, and a program which make it possible to automatically perform image processing suited to the position and pose of a human in an image.

2. Description of the Related Art

Generally, during an operation of performing image processing on an image in which a human appears, and applying an effect (special effect manipulation) to the human, it is necessary for the operator who performs the image processing to judge where the human is located in the image, and what kind of effect should be applied to the human. For example, to apply an effect that creates a greater sense of dashing forward movement to an image in which a human who is dashing forward appears, it is necessary to perform steps such as identifying the position of the human in the image, and selecting an effect suited to the pose of the human. In the related art, those steps are performed manually by the operator.

On the other hand, computer-graphics generated animated images are built on the basis of scenario information describing camera works, character movements, and the like. Therefore, by using the scenario information, effects can be semi-automatically applied to computer-graphics generated animated images (see, for example, Japanese Patent No. 4245433). However, since so-called actual-captured images actually captured with an image capturing apparatus are not images based on such scenario information, it is difficult to apply effects to such actual-captured images semi-automatically.

A technique exists which applies a manipulation to a face region recognized from an image by using a face recognition technique. In the case of manipulation using a face recognition technique, although only a face region is subject to manipulation in many cases, for example, a manipulation can be applied to the body portion through application of a rule that a body exists below a face region. However, depending on the pose of a human, such manipulation using a face recognition technique often results in a manipulated image that looks unnatural.

For example, referring to FIGS. 1A and 1B, a description will be given of an example of effect that puts clothing on a human in an image by using a face recognition technique.

As shown in FIG. 1A, when the rule that a body exists below a face region is applied to an input image P1 in which a human in a vertically oriented pose appears, to apply an effect that superimposes a clothing image P2, this results in an output image P3 that looks relatively natural. In contrast, as shown in FIG. 1B, when the rule that a body exists below a face region is applied to an input image P1' in which a human in a horizontally oriented pose appears, to apply the effect that superimposes the clothing image P2, this results in an output image P3' that looks unnatural.

Even when image processing is performed in this way to apply an effect suited to a human in an image by using a face recognition technique, it is difficult to obtain a result suited to the position or pose of the human in the image.

SUMMARY OF THE INVENTION

As described above, in the case of image processing that applies an effect to a human in an image, it is necessary for the operator who performs the image processing to manually perform steps such as identifying the position of the human in the image and selecting an effect suited to the pose of the human. It is thus difficult to automatically perform image processing suited to the position and pose of the human in the image.

It is thus desirable to make it possible to automatically perform image processing suited to the position and pose of a human in an image.

An image processing system or an image processing apparatus according to an embodiment of the present invention includes storing means for storing a database in which specific pose data representing each of specific poses of a human, and effect manipulation data specifying each of manipulations applied to an image are registered in association with each other, human region detecting means for detecting a human region that is a region where a human appears in an image on which to perform image processing, human pose recognizing means for recognizing a pose of the human in the human region detected by the human region detecting means, matching means for finding the specific pose data matching the pose recognized by the human pose recognizing means, by referencing the database stored in the storing means, and manipulating means for applying a manipulation to the image on the basis of the effect manipulation data associated with the specific pose data found by the matching means.

An image processing method or a program according to an embodiment of the present invention includes the steps of detecting a human region that is a region where a human appears in an image on which to perform image processing, recognizing a pose of the human in the detected human region, finding specific pose data matching the recognized pose by referencing a database in which the specific pose data representing each of specific poses of a human, and effect manipulation data specifying each of manipulations applied to an image are registered in association with each other, the database being stored in storing means for storing the database, and applying a manipulation to the image on the basis of the effect manipulation data associated with the found specific pose data.

According to an embodiment of the present invention, a human region that is a region where a human appears in an image on which to perform image processing is detected, and a pose of the human in the human region is recognized. Then, specific pose data matching the recognized pose is found by referencing a database in which the specific pose data representing each of specific poses of a human, and effect manipulation data specifying each of manipulations applied to an image are registered in association with each other, and a manipulation is applied to the image on the basis of the effect manipulation data associated with the found specific pose data.

BRIEF DESCRIPTION OF THE DRAWINGS

FIG. 2 is a diagram illustrating image processing that applies an effect suited to a human in an image;

FIG. 5 is a diagram showing an example of effect when image processing is applied;

FIG. 6 is a diagram showing an example of effect when image processing is applied;

FIG. 9 is a diagram illustrating the steps of image processing;

FIG. 11 is a diagram illustrating the steps of image processing;

DESCRIPTION OF THE PREFERRED EMBODIMENTS

Hereinbelow, a specific embodiment of the present invention will be described in detail with reference to the drawings.

First, referring to FIG. 2, a description will be given of image processing that applies an effect suited to a human in an image.

FIG. 2 shows an input image P11 on which to perform image processing, an image under processing P12 with a human region and a human pose detected from the input image P11, and an output image P13 obtained as a result of image processing applied to the input image P11.

The input image P11 shows a human who is dashing forward. For the input image P11, a process of detecting a region where the human appears is performed, and as shown in the image under processing P12, a region bounded by a dotted line is detected as a human region. Then, for the human region in the input image P11, a process of recognizing the pose of the human is performed, and a shape as indicated by a thick line shown in the image under processing P12 is detected as a human pose.

Then, as an effect matching such a human pose, a manipulation image that effectively expresses a greater sense of dashing forward movement (for example, an image expressing the air ripped apart by the human) is selected, and image processing is applied to superimpose the manipulation image on the input image P11. This can provide the output image P13 to which an effect (a manipulation having the special effect of emphasizing the human's motion, emotion, or the like) suited to the human in the image has been applied.

Figure 1A:
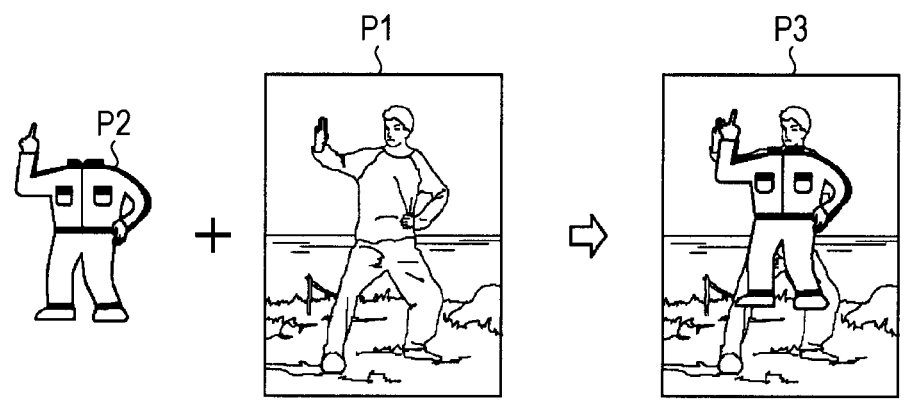
FIGS. 1A and 1B are diagrams each showing an example of effect that puts clothing on a human in an image by using a face recognition technique.
Figure 1B:
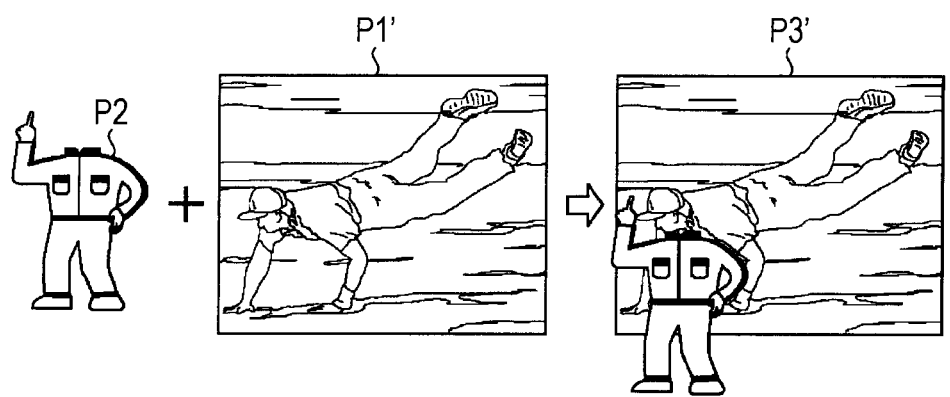
Figure 3:
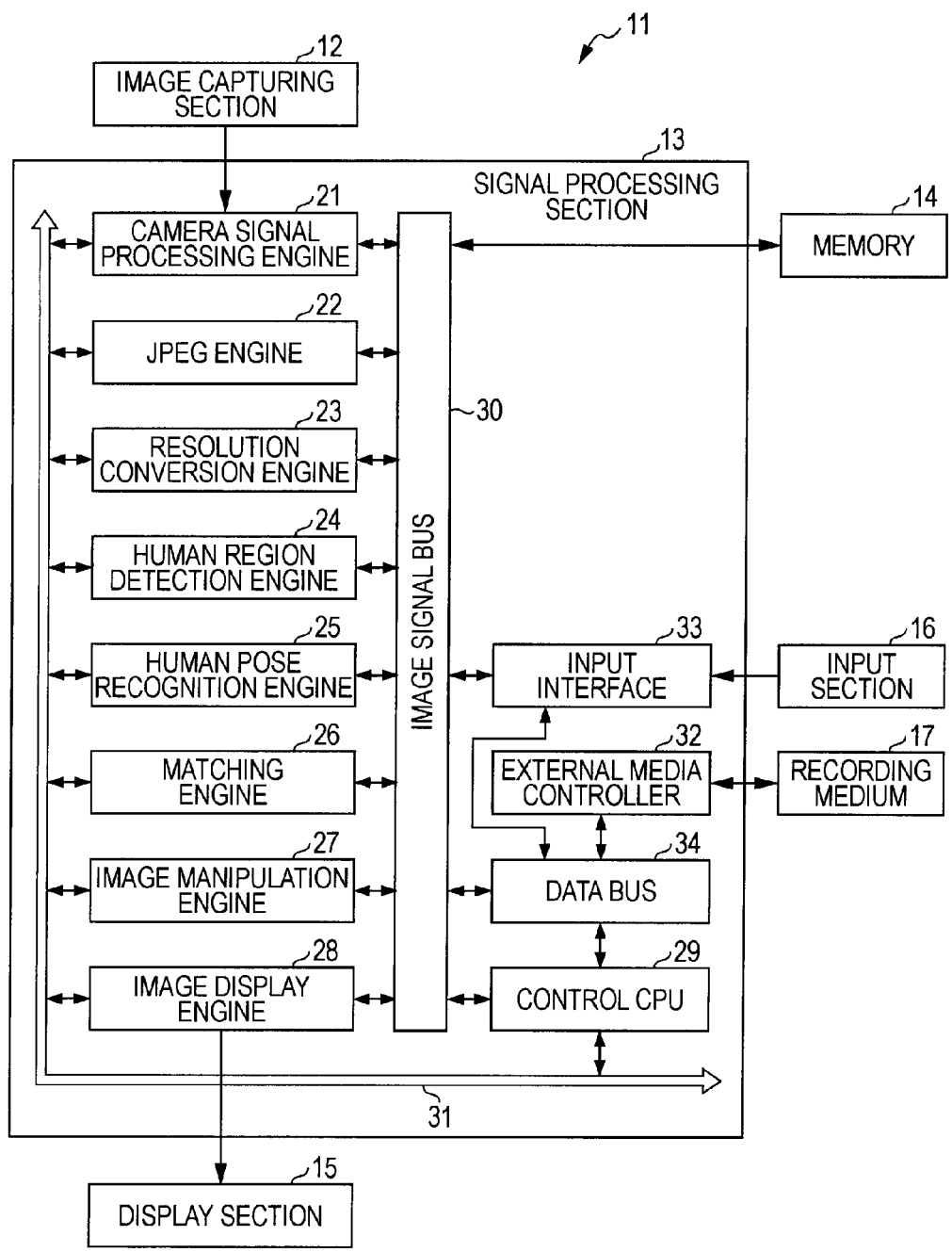
FIG. 3 is a block diagram showing an example of the configuration of a digital camera according to an embodiment of the present invention.

Next, FIG. 3 is a block diagram showing an example of the configuration of a digital camera according to an embodiment of the present invention.

In FIG. 3, the digital camera 11 includes an image capturing section 12, a signal processing section 13, a memory 14, a display section 15, and an input section 16. A recording medium 17 can be inserted into and removed from the digital camera 11.

The image capturing section 12 includes an optical system formed by a lens or a diaphragm, and an imager formed by a CCD (Charge Coupled Device) or CMOS (Complementary Metal-Oxide Semiconductor) sensor. The image capturing section 12 converts an optical image of a subject formed on the light receiving section of the imager by the optical system, into an electrical signal, and supplies the electrical signal of the image obtained by the conversion to the signal processing section 13.

The signal processing section 13 is formed either as a substrate provided with a plurality of electronic components, or as a system IC (Integrated Circuit) or the like. The signal processing section 13 generates image data by applying various kinds of signal processing to the electrical image of the image supplied from the image capturing section 12. The image capturing section 12 applies various kinds of image processing to the image data.

The memory 14 is formed by a flash memory such as a ROM (Read Only Memory), a RAM (Random Access Memory), or an EEPROM (Electronically Erasable and Programmable Read Only Memory). The memory 14 stores various kinds of data (database) necessary for signal processing in the signal processing section 13, and temporarily stores image data on which to perform image processing.

The display section 15 is formed by an LCD (Liquid Crystal Display), an organic EL (Electro Luminescence) display, or the like. The display section 15 displays various kinds of image in accordance with control by the signal processing section 13.

The input section 16 is formed by a button, a switch, a touch panel overlaid on the display section 15, or the like. The input section 16 supplies a signal corresponding to a user's operation to the signal processing section 13.

The recording medium 17 is a medium such as a memory card with a built-in non-volatile semiconductor memory or the like. Image data on images captured with the digital camera 11 or other digital cameras is stored (recorded) on the recording medium 17. It should be noted that the recording medium 17 is not limited to a memory card with a built-in semiconductor or the like, but may be a magnetic disk such as a hard disk, an optical disc such as a DVD (Digital Versatile Disc), a magneto-optical disc, or the like. Also, other than being a removable recording medium, the recording medium 17 may be a recording medium built in the digital camera 11.

The signal processing section 13 includes a camera signal processing engine 21, a JPEG (Joint Photographic Experts Group) engine 22, a resolution conversion engine 23, a human region detection engine 24, a human pose recognition engine 25, a matching engine 26, an image manipulation engine 27, an image display engine 28, a control CPU (Central Processing Unit) 29, an image signal bus 30, a control signal bus 31, an external media controller 32, an input interface 33, and a data bus 34.

The camera signal processing engine 21, the JPEG engine 22, the resolution conversion engine 23, the human region detection engine 24, the human pose recognition engine 25, the matching engine 26, the image manipulation engine 27, the image display engine 28, the control CPU 29, the data bus 34, and the memory 14 are connected to each other by the image signal bus 30 through which an image signal as a signal of image data is transmitted.

The camera signal processing engine 21, the JPEG engine 22, the resolution conversion engine 23, the human region detection engine 24, the human pose recognition engine 25, the matching engine 26, the image manipulation engine 27, and the image display engine 28 each supply image data to the memory 14 via the image signal bus 30 to temporarily store the image data into the memory 14, or reads image data temporarily stored in the memory 14 from the memory 14 via the image signal bus 30.

Also, the camera signal processing engine 21, the JPEG engine 22, the resolution conversion engine 23, the human region detection engine 24, the human pose recognition engine 25, the matching engine 26, the image manipulation engine 27, the image display engine 28, and the control CPU 29 are connected to each other by the control signal bus 31 through which a control signal is transmitted.

The control CPU 29 acquires a control signal via the control signal bus 31 and supplies the control signal to control each of the camera signal processing engine 21, the JPEG engine 22, the resolution conversion engine 23, the human region detection engine 24, the human pose recognition engine 25, the matching engine 26, the image manipulation engine 27, and the image display engine 28.

Further, the control CPU 29, the external media controller 32, and the input interface 33 are connected to each other via the data bus 34.

The control CPU 29 controls the external media controller 32 via the data bus 34, and causes the external media controller 32 to store image data supplied via the image signal bus 30 and the data bus 34 onto the recording medium 17. Also, the control CPU 29 causes the external media controller 32 to read image data stored on the recording medium 17 from the recording medium 17.

Under control by the control CPU 29 via the control signal bus 31, the camera signal processing engine 21 applies various kinds of signal processing, such as conversion to a digital signal, noise removal, or white-balance adjustment, to the electrical signal of an image supplied from the image capturing section 12. The camera signal processing engine 21 temporarily stores image data obtained as a result of the signal processing into the memory 14.

Under control by the control CPU 29 via the control signal bus 31, the JPEG engine 22 reads, from the memory 14, the image data supplied from the camera signal processing engine 21 and temporarily stored in the memory 14, and encodes the read image data in JPEG format. The JPEG engine 22 supplies the encoded image data to the external media controller 32 via the image signal bus 30 and the data bus 34. In this case, the external media controller 32 stores (records) the image data encoded in JPEG format onto the recording medium 17.

Also, under control by the control CPU 29 via the control signal bus 31, the JPEG engine 22 acquires the image data encoded in JPEG format, which is read from the recording medium 17, by the external media controller 32 via the image signal bus 30 and the data bus 34, and decodes the image data encoded in JPEG format. The JPEG engine 22 temporarily stores the decoded image data into the memory 14.

Under control by the control CPU 29 via the control signal bus 31, the resolution conversion engine 23 reads image data temporarily stored in the memory 14 from the memory 14 via the image signal bus 30, and applies a process of converting image resolution to the image data. The resolution conversion engine 23 supplies the image data of the resolution-converted image to the memory 14 via the image signal bus 30, and temporarily stores the image data into the memory 14.

Under control by the control CPU 29 via the control signal bus 31, the human region detection engine 24 reads image data temporarily stored in the memory 14 from the memory 14 via the image signal bus 30, and performs a process of detecting a human region that is a region where a human appears in an image represented by the read image data.

For example, the human region detection engine 24 performs a process of detecting a human region by a method that includes generating images at different scale factors from a read image, extracting a feature point for each of those images at different scale factors, applying filtering to the feature point to calculate feature quantities, and detecting a human region by statistical learning using the feature quantities. It should be noted that, for example, the method of detecting a human region is not limited to this method, but other methods may be also adopted, such as the method introduced by the paper "Navneet Dalal and Bill Triggs, "Histograms of Oriented Gradients for Human Detection", CVPR, 2005".

As a result of the process of detecting a human region, the human region detection engine 24 acquires human region data that specifies the human region in the image, and supplies the human region data to the human pose recognition engine 25 via the image signal bus 30 or the control signal bus 31.

Under control of the control CPU 29, the human pose recognition engine 25 reads image data temporarily stored in the memory 14 from the memory 14 via the image signal bus 30, and performs a process of recognizing a human pose within the region specified by the human region data from the human region detection engine 24.

In the process of recognizing a human pose, as will be described later with reference to FIG. 7, the pose of a human shown in an image is represented by, for example, 10 parts. As a result of the process of recognizing a human pose, the human pose recognition engine 25 acquires human pose data including the positions of individual parts representing the human pose, and supplies the human pose data to the matching engine 26 via the image signal bus 30 or the control signal bus 31.

Under control of the control CPU 29, the matching engine 26 references an effect database stored in the memory 14, and determines effect manipulation data suited to the pose represented by the human pose data from the human pose recognition engine 25. The memory 14 stores, for example, an effect database in which specific pose data representing each of various specific poses, and effect manipulation data suited to each piece of specific pose data are associated with each other.

The matching engine 26 performs matching between each of poses represented by all the pieces of specific pose data registered in the effect database in the memory 14, and the pose recognized by the human pose recognition engine 25, and calculates a matching score (distance D in equation (10) described later). Then, the matching engine 26 determines effect manipulation data associated with the specific pose data with which the highest matching score is obtained, as the effect manipulation data suited to the pose of the human in the image.

Under control by the control CPU 29, the image manipulation engine 27 reads image data temporarily stored in the memory 14 from the memory 14 via the image signal bus 30, and performs a process of manipulating the corresponding image by using the effect manipulation data determined by the matching engine 26. For example, as will be described later with reference to FIGS. 9 to 11, the image manipulation engine 27 performs manipulation such as superimposing a manipulation image, or applying a filter.

Under control by the control CPU 29 via the control signal bus 31, the image display engine 28 reads image data temporarily stored in the memory 14 from the memory 14 via the image signal bus 30, and displays an image corresponding to the read image data on the display section 15. Also, in accordance with control by the control CPU 29, the image display engine 28 displays a GUI (Graphical User Interface) image on the display section 15.

The control CPU 29 is formed by an embedded CPU, or formed as a CPU built in a system IC. The control CPU 29 executes a program stored in a built-in ROM or RAM, and in accordance with a signal from the input section 16 corresponding to a user's operation supplied via the input interface 33 and the data bus 34, acquires and supplies a control signal via the control signal bus 31, thereby controlling each of the camera signal processing engine 21, the JPEG engine 22, the resolution conversion engine 23, the human region detection engine 24, the human pose recognition engine 25, the matching engine 26, the image manipulation engine 27, the image display engine 28, the external media controller 32, and the input interface 33.

The external media controller 32 controls storage (recording) of various kinds of data including image data onto the recording medium 17 being inserted, and also controls reading of various kinds of data stored (recorded) on the recording medium 17 being inserted. It should be noted that when the recording medium 17 is a magnetic disk, an optical disc, or the like, a drive (not shown) is provided, and the external media controller 32 controls recording or reading of data onto and from the recording medium 17 by the drive.

The input interface 33 supplies a signal from the input section 16 to the control CPU 29 via the data bus 34, such as by receiving an input of the signal from the input section 16 and shaping the inputted signal into a predetermined format.

In the signal processing section 13 configured as described above, for example, image processing to apply an effect to a human in an image is performed with respect to an image captured by the image capturing section 12 and stored onto the recording medium 17.

Figure 4:
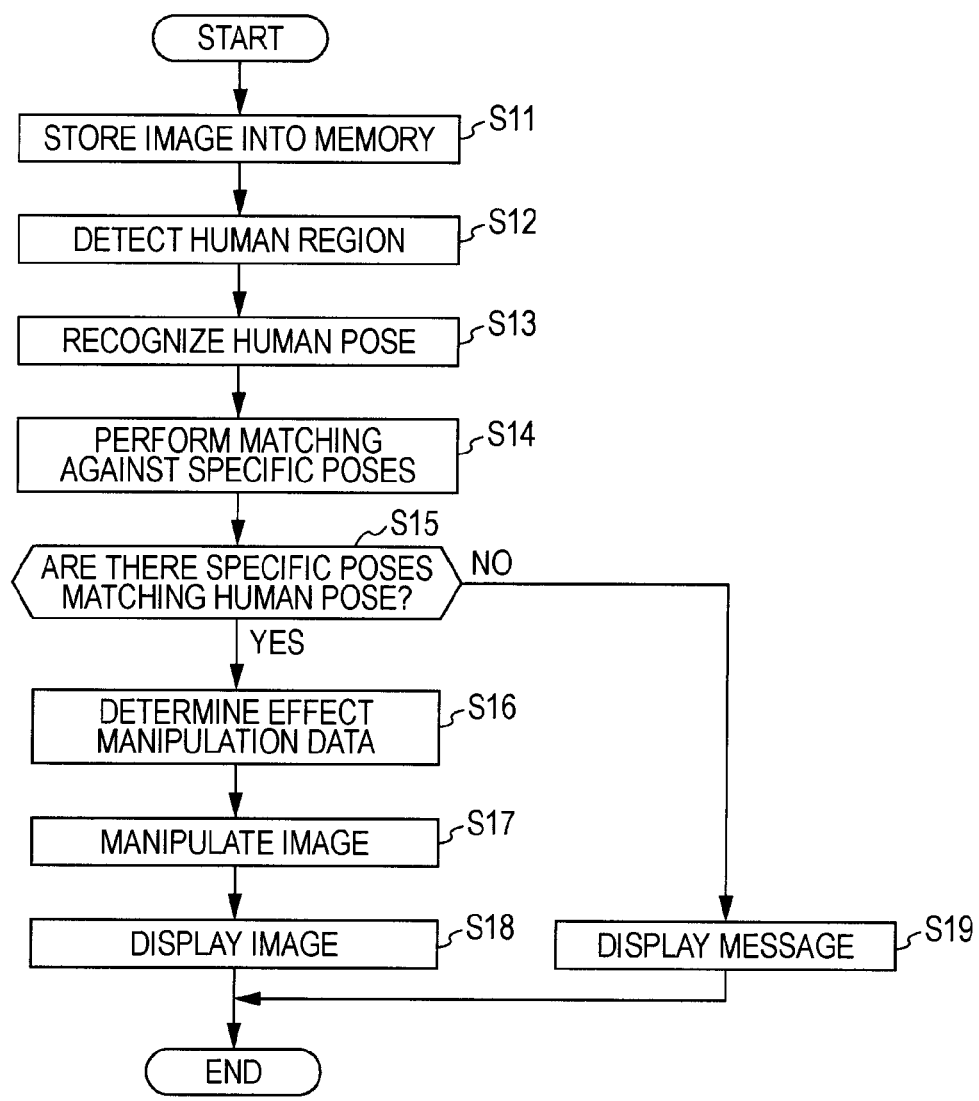
FIG. 4 is a flowchart illustrating image processing that applies an effect to a human in an image.

FIG. 4 is a flowchart illustrating image processing in which the signal processing section 13 shown in FIG. 3 applies an effect to a human in an image.

For example, when the user specifies an image in which a human appears, and operates the input section 16 of the digital camera 11 so as to perform image processing, the processing is started. In step S11, the control CPU 29 controls the external media controller 32 to read image data of the image specified by the user from the recording medium 17, and store the image data into the memory 14 via the image signal bus 30.

After step S11, the processing proceeds to step S12, in which the human region detection engine 24 performs a process of detecting a human region with respect to an image (hereinafter, referred to as input image as appropriate) corresponding to the image data stored into the memory 14 in step S11, thereby detecting a human region that is a region where a human appears in the input image. Then, the human region detection engine 24 supplies human region data specifying the human region in the input image to the human pose recognition engine 25, and the processing proceeds to step S13.

In step S13, the human pose recognition engine 25 performs a process of recognizing a human pose with respect to the human region specified by the human region data from the human region detection engine 24. The human pose recognition engine 25 acquires human pose data including the positions of individual parts representing a human pose, and supplies the human pose data to the matching engine 26. Then, the processing proceeds to step S14.

In step S14, the matching engine 26 performs matching between poses represented by specific pose data registered in the effect database stored in the memory 14, and the pose represented by the human pose data from the human pose recognition engine 25, and calculates matching scores.

In step S15, on the basis of the matching scores calculated in step S14, the matching engine 26 judges whether or not there are specific poses that match the human pose detected in step S13. For example, if matching scores equal to or higher than a predetermined threshold are calculated, the matching engine 26 judges that there are specific poses matching the human pose detected in step S13, and the processing proceeds to step S16.

In step S16, the matching engine 26 determines, as the effect manipulation data suited to the pose of the human in the input image, effect manipulation data associated with a specific pose for which the highest matching score has been calculated, among the specific poses for which the matching scores equal to or higher than a predetermined threshold have been calculated.

In step S17, the image manipulation engine 27 manipulates the input image in accordance with the effect manipulation data determined in step S16, and stores image data corresponding to an image obtained as a result of the manipulation (hereinafter, referred to as output image as appropriate) into the memory 14.

In step S18, the image display engine 14 reads the image data of the output image stored in the memory 14, and displays an image corresponding to the image data on the display section 15. Then, the processing ends.

On the other hand, if it is judged in step S15 by the matching engine 26 that there is no specific pose that matches the human pose detected in step S13, for example, if all the matching scores calculated in step S14 are less than a predetermined threshold, the processing proceeds to step S19.

In step S19, the control CPU 29 controls the image display engine 28 to display on the display section 15 a message stating that it is not possible to apply an effect suited to the pose of the human in the image specified. Then, the processing ends.

As described above, in the signal processing section 13, a human pose in a human region detected by the human region detection engine 24 is recognized by the human pose recognition engine 25, effect manipulation data matching (in correspondence with or substantially in correspondence to some extent with) the human pose is determined by the matching engine 26, and the image is manipulated in accordance with the effect manipulation data. Therefore, the signal processing section 13 can automatically perform image processing that applies a more naturalistic effect suited to the position and pose of a human in an input image.

For example, FIGS. 5 and 6 each show an example of effect when image processing is applied by the signal processing section 13.

For example, as shown in FIG. 5, when an input image P21 in which a human who is striking a victory pose with the arms raised is taken as an object on which to perform image processing, the human region detection engine 24 performs a process of detecting a human region (step S12 in FIG. 4) with respect to the input image P21. As a result, the human region detection engine 24 detects, as the human region, a region bounded by the dotted line shown in an image under processing P22.

Then, the human pose recognition engine 25 performs a process of recognizing a human pose (step S13 in FIG. 4) with respect to this human region, and recognizes, as the human pose, a shape represented by the thick lines shown in the image under processing P22.

Thereafter, the matching engine 26 finds a specific pose that matches the human pose recognized by the human pose recognition engine 25, and determines effect manipulation data associated with the specific pose (step S16 in FIG. 4). For example, as effect manipulation data suited to a human who is striking a victory pose with the arms raised, effect manipulation data formed by a manipulation image including effect lines that spread out from the human, and the letters "HOORAY!!" that pop up three-dimensionally is determined. Then, the image manipulation engine 27 applies a manipulation (step S17 in FIG. 4) based on the effect manipulation data to the input image P21, thereby obtaining an output image P23.

Also, as shown in FIG. 6, when an input image P31 in which a human adopting a pose with both hands and both knees on the ground appears is taken as an object on which to perform image processing, the human region detection engine 24 performs a process of detecting a human region (step S12 in FIG. 4) with respect to the input image P31. As a result, the human region detection engine 24 detects, as the human region, a region bounded by the dotted line shown in an image under processing P32.

Then, the human pose recognition engine 25 performs a process of recognizing a human pose (step S13 in FIG. 4) with respect to this human region, and recognizes, as the human pose, a shape represented by the thick lines shown in the image under processing P32.

Thereafter, the matching engine 26 finds a specific pose that matches the human pose recognized by the human pose recognition engine 25, and determines effect manipulation data associated with the specific pose (step S16 in FIG. 4). For example, as effect manipulation data suited to a human adopting a pose with both hands and both knees on the ground, effect manipulation data formed by a manipulation image including a filter that darkens the region other than the region in which a spotlight is shone from above the human, and the oblique letters "OH NO . . . ". Then, the image manipulation engine 27 applies a manipulation (step S17 in FIG. 4) based on the effect manipulation data to the input image P31, thereby obtaining an output image P33.

Next, a description will be given of the process of detecting a human pose by the human pose recognition engine 25, and the process of performing matching by the matching engine 26.

Figure 7:
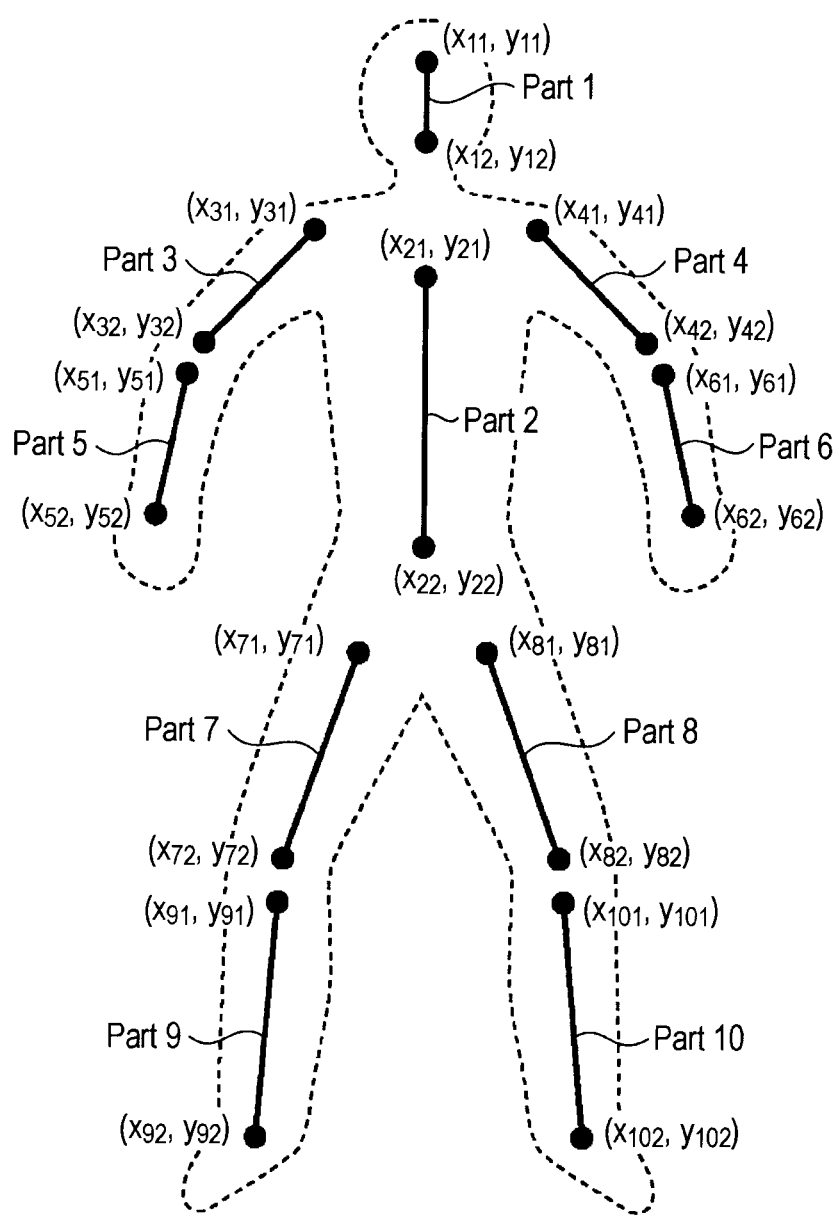
FIG. 7 shows 10 parts used in human pose data.

FIG. 7 shows 10 parts used in human pose data obtained as a result of the process of detecting a human pose by the human pose recognition engine 25.

The human pose recognition engine 25 detects the pose of a human in an image on the basis of 10 parts Part 1 to Part 10 as shown in FIG. 7. The part Part 1 corresponds to the head, the part Part 2 corresponds to the torso, the part Part 3 corresponds to the right upper arm, the part Part 4 corresponds to the left upper arm, the part Part 5 corresponds to the right lower arm, the part Part 6 corresponds to the left lower arm, the part Part 7 corresponds to the right upper leg, the part Part 8 corresponds to the left upper leg, the part Part 9 corresponds to the right lower leg, and the part Part 10 corresponds to the left lower leg.

The human pose recognition engine 25 finds the coordinates of both ends of a part Part i (i=1, 2, . . . , 10) detected from an image, as positional information $p_i=(x_{i1}, y_{i1}, x_{i2}, y_{i2})$ of the part Part i, and acquires pose data $L=\{p_1, P_2, \ldots, p_{10}\}$ indicating the pose of the human in the image. If only the upper body of the human appears in the image, the human pose recognition engine 25 acquires pose data $L=\{p_1, p_2, \ldots, p_6\}$ indicating the pose of the upper body of the human found from the parts Part 1 to Part 6 of the upper body.

As described above, the memory 14 stores the effect database in which specific pose data representing each of various specific poses, and effect manipulation data suited to each piece of pose data are associated with each other. The matching engine 26 performs matching between each piece of the specific pose data with the pose data L detected from an image. That is, letting Lo be specific pose data registered in the memory 14, the matching engine 26 finds a difference in position for each of the parts with respect to the specific pose data Lo and the pose data L.

First, to make the specific pose data Lo and the pose data L the same in size, the matching engine 26 finds the length $|Lo_i|$ of a part Part i of the specific pose data Lo, and the length $|L_i|$ of the part Part i of the pose data L, by computing equation (1) and equation (2) below.

$$|Lo_i|=\sqrt{(xo_{i2}-xo_{i1})^2+(yo_{i2}-yo_{i1})^2} \quad (1)$$

$$|L_i|=\sqrt{(x_{i2}-x_{i1})^2+(y_{i2}-y_{i1})^2} \quad (2)$$

It should be noted that $xo_{i2}$ denotes the x-coordinate of the lower end of the part Part i of the specific pose data Lo, $xo_{i1}$ denotes the x-coordinate of the upper end of the part Part i of the specific pose data Lo, $yo_{i2}$ denotes the y-coordinate of the lower end of the part Part i of the specific pose data Lo, and $yo_{i1}$ denotes the y-coordinate of the upper end of the part Part i of the specific pose data Lo. Also, $x_{i2}$ denotes the x-coordinate of the lower end of the part Part i of the pose data L, $x_{i1}$ denotes the x-coordinate of the upper end of the part Part i of the pose data L, $y_{i2}$ denotes the y-coordinate of the lower end of the part Part i of the pose data L, and $y_{i1}$ denotes the y-coordinate of the upper end of the part Part i of the pose data L.

It should be noted that, for example, in the process of making the specific pose data Lo and the pose data L the same in size, more reliable matching results can be obtained by performing processing on the basis of the size of the head (part Part 1) or the size of the torso (part Part 2).

Then, the matching engine 26 finds a scale factor s for making the specific pose data Lo and the pose data L the same in size by computing equation (3) below.

$$s = \frac{|Lo_i|}{|L_i|} \quad (3)$$

Next, to make the overall tilt of the pose data L the same as the overall tilt of the specific pose data Lo, the matching engine 26 finds the tilt $\theta_i$ of an arbitrary part Part i of the pose data L with respect to the arbitrary part Part i of the specific pose data Lo, from equation (4) below. For example, by making the tilt of the torso of the pose data L the same as that of the torso (part Part 2) of the specific pose data Lo, the matching engine 26 can make the overall tilt of the pose data L the same as the overall tilt of the specific pose data Lo.

$$\theta_i = \arg(po_i) - \arg(p_i) \quad (4)$$

It should be noted that $\arg(po_i)$ denotes the angle of the part Part i of the specific pose data Lo, and $\arg(po_i)$ denotes the angle of the part Part i of the pose data L. For example, the angle $\arg(po_i)$ can be found on the basis of equation (5) below from the positional information $p_i=(x_{i1}, y_{i1}, x_{i2}, y_{i2})$ of the part Part i.

$$\arg(p_i) = \tan^{-1} \frac{y_{i2} - y_{i1}}{x_{i2} - x_{i1}} \quad (5)$$

Then, by using a rotation matrix $R(\theta_i)$ indicated by equation (6) below, from the positional information $p_i=(x_{i1}, y_{i1}, x_{i2}, y_{i2})$ of the part Part i, the tilt $\theta_i$, and the scale factor s (above-described equation (3)), positional information $p'_i=(x_{i1}', Y_{i1}', x_{i2}', y_{i2}')$ of the part Part i constituting pose data L' whose tilt and size are made the same as those as the specific pose data Lo is found from equation (7) below.

$$R(\theta_i) = \begin{pmatrix} \cos\theta_i & -\sin\theta_i \\ \sin\theta_i & \cos\theta_i \end{pmatrix} \quad (6)$$

$$\begin{pmatrix} x'_i \\ y'_i \end{pmatrix} = s \times R(\theta_i) \begin{pmatrix} x_i - \frac{x_{i1} + x_{i2}}{2} \\ y_i - \frac{y_{i1} + y_{i2}}{2} \end{pmatrix} \quad (7)$$

From the positional information $p'_i$ of the part Part i found in this way, the matching engine 26 calculates pose data L' ($L'=\{p_1', p_2', \ldots, p_{10}'\}$) whose tilt and size are made the same as those of the specific pose data Lo.

Further, for each of the respective parts of the specific pose data Lo and the pose data L', the matching engine 26 finds a difference in position $D_i$ (i=1, 2, . . . , 10) for each of the parts by computing either equation (8) or equation (9) below.

$$D_i = \sqrt{(xo_{i2}-x_{i2})^2 + (yo_{i2}-y_{i2})^2} + \sqrt{(xo_{i1}-x_{i1})^2 + (yo_{i1}-y_{i1})^2} \quad (8)$$

$$D_i = |xo_{i2}-x_{i2}| + |yo_{i2}-y_{i2}| + |xo_{i1}-x_{i1}| + |yo_{i1}-y_{i1}| \quad (9)$$

Then, the matching engine 26 calculates a distance D between the specific pose data Lo and the pose data L by finding the sum total of the differences $D_i$ found by equation (8) or equation (9), that is, by computing equation (10) below.

$$D = \sum_i D_i \quad (10)$$

The matching engine 26 performs such a process of calculating the distance D with respect to every piece of specific pose data registered in the memory 14. The distance D is a matching score. The smaller the value of the distance D for the specific pose data Lo, the more similar the corresponding pose is to the pose of a human in an image.

It should be noted that in the effect database stored in the memory 14, each piece of specific pose data is classified in accordance with a human pose, for example, into specific pose data for a vertically oriented pose and specific pose data for a horizontally oriented pose. Therefore, depending on whether a human pose recognized by the human pose recognition engine 25 is vertically oriented or horizontally oriented (for example, depending on the orientation of the part Part 2), matching is performed against the corresponding specific pose data.

That is, if a human pose recognized by the human pose recognition engine 25 is vertically oriented, the matching engine 26 performs matching against each piece of specific pose data classified into a vertically oriented pose in the effect database stored in the memory 14, and if a human pose recognized by the human pose recognition engine 25 is horizontally oriented, the matching engine 26 performs matching against each piece of specific pose data classified into a horizontally oriented pose in the effect database stored in the memory 14. By performing matching against specific pose data classified in accordance with the orientation of a human in this way, the time necessary for matching can be shortened.

Further, in the effect database stored in the memory 14, each piece of specific pose data may not only be classified in accordance with whether the corresponding pose is vertically oriented or horizontally oriented but may also be classified more finely in accordance with the degree of tilt of the corresponding pose. In this case, in accordance with the degree of tilt of a human pose recognized by the human pose recognition engine 25, the matching engine 26 can perform matching against each piece of specific pose data classified into the corresponding degree of tilt. In this way, specific pose data suited to each of a plurality of degrees of tilt of a human pose can be found in a short time.

In this way, the human pose recognition engine 25 finds the pose data $L=\{p_1, p_2, \ldots, p_{10}\}$, and the matching engine 26 finds the distance D, thereby making it possible to determine specific pose data that matches the pose of a human in an image (such as the positions of arms and legs).

It should be noted that the method of recognizing a human pose is not limited to the method described above, but other methods may be adopted, such as the method introduced by the paper "Deva Ramanan, "Learning to parse images of articulated bodies", NIPS, 2006", for example. The method introduced by this paper makes it possible to obtain a human pose as well as the difference between a background and a human region in finer detail.

Then, as the image manipulation engine 27 manipulates the image on the basis of effect manipulation data associated with the specific pose data determined by the matching engine 26, image processing can be performed to apply an effect suited to the pose of the human in the image. Also, in accordance with the size and position of the human in the image (for example, the size and position of the human region detected by the human region detection engine 24), the image manipulation engine 27 adjusts the size and position for which to apply an effect, thereby performing image processing that applies an effect suited to the size and position of the human in the image.

Figure 8:
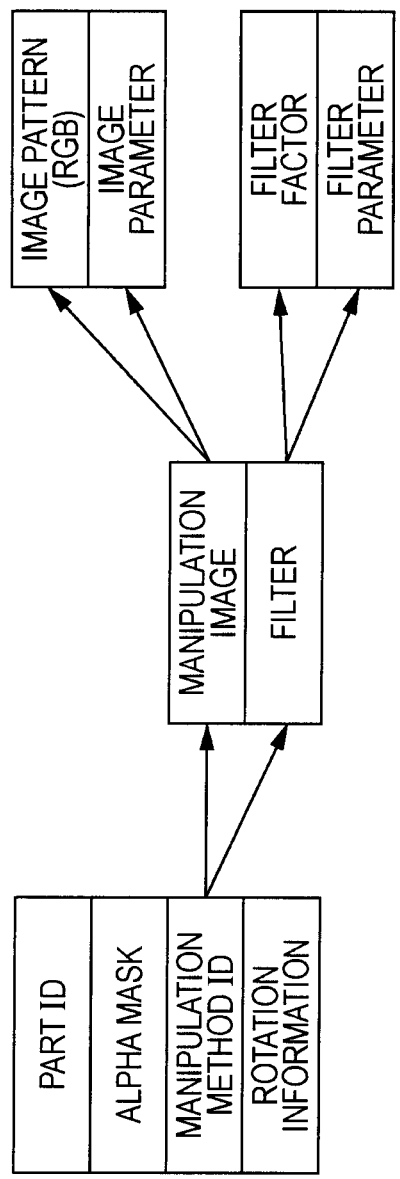
FIG. 8 is a diagram showing an example of effect manipulation data.

Next, FIG. 8 shows an example of effect manipulation data stored in the memory 14.

Effect manipulation data includes part ID (Identification), alpha mask, manipulation method ID, and rotation information.

Part ID is data for specifying a part of a human to which to apply a manipulation using effect manipulation data, and specifies, for example, each of six portions including a head, a torso, a left upper arm, a right upper arm, a left lower arm, and a right lower arm. In the image manipulation engine 27, a manipulation based on effect manipulation data is performed for each of the parts specified by a part ID. For example, the part ID is set to 1 with respect to effect manipulation data for the head, the part ID is set to 2 with respect to effect manipulation data for the torso, the part ID is set to 3 with respect to effect manipulation data for the left upper arm, the part ID is set to 4 with respect to effect manipulation data for the right upper arm, the part ID is set to 5 with respect to effect manipulation data for the left lower arm, and the part ID is set to 6 with respect to effect manipulation data for the right lower arm.

Alpha mask is manipulation ratio data representing a region to be manipulated, as a relative position with respect to the position of a part specified by a part ID. For example, if the value of an alpha mask is 100, a region in an output image corresponding to the alpha mask is replaced with a manipulation image at a ratio of 100%. If the value of an alpha mask is α, a region in an output image corresponding to the alpha mask is replaced with a manipulation image at a ratio such that the pixel value of the output image=the pixel value of an input image×(1.0−α/100)+the pixel value of the manipulation image×α/100.

Manipulation method ID is data for specifying either a manipulation method of superimposing a manipulation image or a manipulation method of applying a filter. The manipulation method of superimposing a manipulation image is a method of obtaining an output image by superimposing a manipulation image prepared in advance on an input image, and the manipulation method of applying a filter is a method of obtaining an output image by applying a filter to an input image.

Rotation information is data related to rotation of a region to be manipulated represented by an alpha mask, with respect to an input image. For example, in the case of effect manipulation data which applies a manipulation in accordance with the orientation of an input image at all times independently of the tilt of a human shown in the input image, data indicating no rotation is held in the rotation information.

The manipulation method of superimposing a manipulation image includes image pattern and image parameter, and the method of applying a filter includes filter factor and filter parameter.

Image pattern holds a manipulation image represented by four channels of RGBα. For example, if a manipulation method ID specifies the manipulation method of superimposing a manipulation image, a manipulation image held in the image pattern is superimposed on an input image on the basis of an alpha mask.

Image parameter holds various kinds of parameter used when superimposing a manipulation image on an input image. For example, as a parameter held in the image parameter, information specifying how to rotate a manipulation image with respect to an input image is held. For example, with respect to a manipulation image for which a manipulation is to be applied in accordance with the orientation of a part to be manipulated, information indicating "No rotation" is held in the image parameter. Also, for example, as for a manipulation image representing flames, it is desirable that flames be displayed so as to rise upwards in an image at all times. Thus, information indicating "Upward orientation in the image" is held in the image parameter.

Also, the image parameter holds information specifying how to manipulate a manipulation image more effectively onto an input image. For example, the image parameter holds information specifying that for a manipulation image representing flames, the manipulation image is to be processed so as to appear flickering and then manipulated onto an input image.

Filter factor holds the factor of a spatial filter applied to an input image. For example, if a manipulation method ID specifies the manipulation method of applying a filter, a filter with the factor held in the filter factor is applied to the input image on the basis of an alpha mask.

Filter parameter holds various kinds of parameter used when applying a filter to an input image. Examples of parameter held in the filter parameter include a numerical value specifying the interval (every N pixels) of mosaicking in a mosaicking process using a smoothing filter, and a numerical value specifying a ratio (for example, 20%) with respect to the brightness of an input image in the case of a filter that darkens an image.

Figure 10:
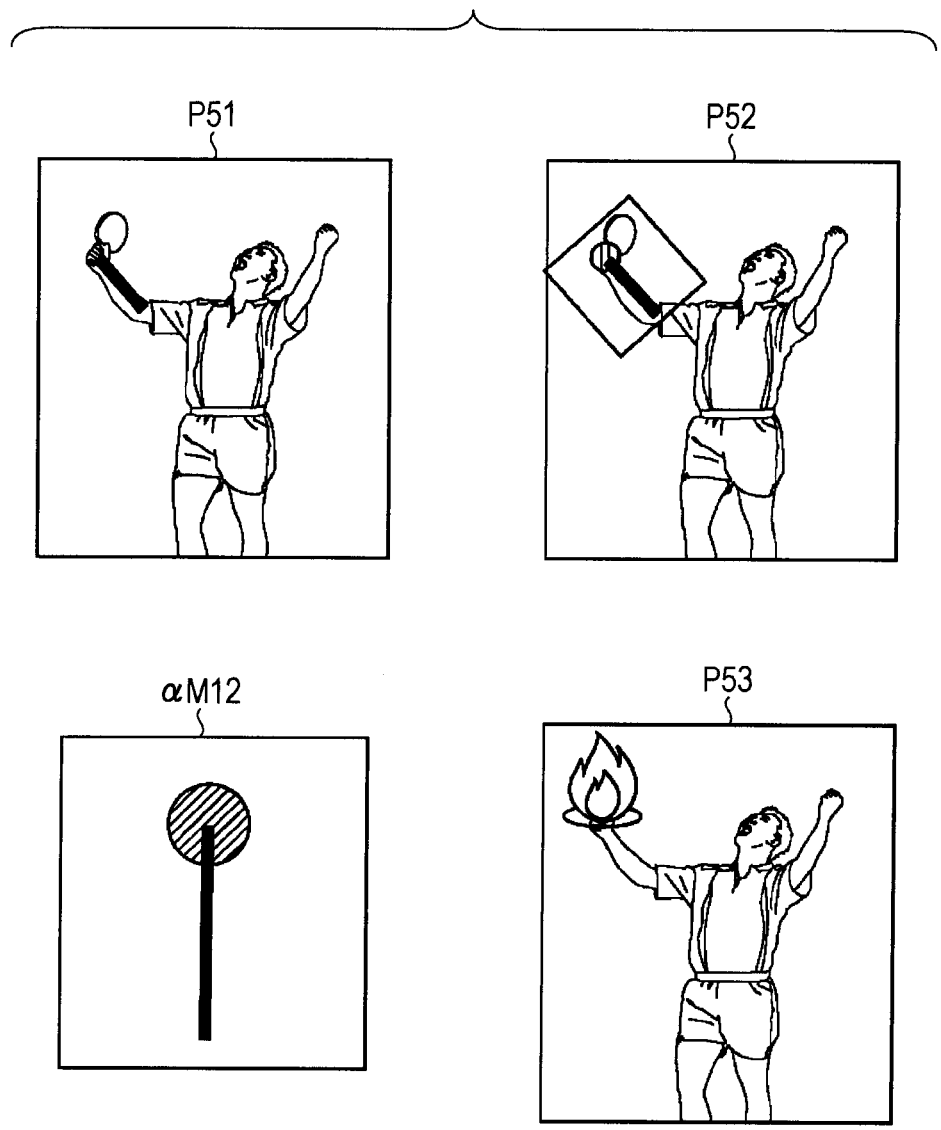
FIG. 10 is a diagram illustrating the steps of image processing.

Referring to FIGS. 9 to 11, the steps of image processing based on effect manipulation data will be described.

FIG. 9 illustrates an example of image processing performed on the right lower arm part (part ID: 6) on the basis of effect manipulation data, with respect to an input image P41 in which a human who is striking a victory pose with the arms raised appears.

As indicated by an alpha mask αM11, the effect manipulation data in the example in FIG. 9 holds data that specifies a manipulation ratio 100 for a region hatched with oblique lines near the right lower arm part indicated by a thick line, and specifies a manipulation ratio 0 for the other region. Also, the manipulation method ID of the effect manipulation data specifies the manipulation method of applying a filter. An N×N smoothing filter as indicated by a filter factor f11 is held in the filter factor, and information indicating that a filter is to be applied every N pixels is held in the filter parameter.

In image processing based on such effect manipulation data, as indicated by an image under processing P42, the size, orientation, and position of the alpha mask αM11 are adjusted so that the right lower arm part of the alpha mask αM11 is overlaid on the right lower arm part recognized in the input image P41. Mosaic manipulation (manipulation in which the N×N smoothing filter is applied for every N pixels) is applied to the region specified by the manipulation ratio 100 of the alpha mask αM11 overlaid on the input image P41 in this way, and the data of the input image P41 in that region is replaced with the mosaicked data. As a result, an output image P43 with mosaicking applied to the right lower arm is acquired.

Next, FIG. 10 illustrates an example of image processing performed on the right lower arm part (part ID: 6) on the basis of effect manipulation data different from that in the case of FIG. 9, with respect to an input image P51 in which a human who is striking a victory pose with the arms raised appears.

As indicated by an alpha mask αM12, the effect manipulation data in the example in FIG. 10 holds data that specifies a manipulation ratio 100 for a circular region hatched with oblique lines at the distal end portion of the right lower arm part indicated by a thick line, and specifies a manipulation ratio 0 for the other region. Also, the manipulation method ID of the effect manipulation data specifies the manipulation method of superimposing a manipulation image. A manipulation image of flames as indicated by an image pattern PTN11 is held in the image pattern, and information indicating upward orientation in the image is held in the image parameter.

In image processing based on such effect manipulation data, as indicated by an image under processing P52, the size, orientation, and position of the alpha mask αM12 are adjusted so that the right lower arm part of the alpha mask αM12 is overlaid on the right lower arm part recognized in the input image P51. The image pattern PTN11 is superimposed on the region specified by the manipulation ratio 100 of the alpha mask αM12 overlaid on the input image P51 in this way. At this time, in accordance with the image parameter, the image pattern PTN11 is rotated with respect to the tilt of the alpha mask αM12 so that the upper side of the image pattern PTN11 coincides with the upper side of the input image P51. That is, the orientation of the image pattern PTN11 becomes the same as the orientation of the input image P51. As a result, an output image P53 is obtained in which the manipulation image of flames is superimposed on the distal end of the right lower arm, that is, on the first of the right hand.

Next, FIG. 11 illustrates an example of image processing performed on the torso part (part ID: 2) on the basis of effect manipulation data, with respect to an input image P61 showing a human adopting a pose with both hands and both knees on the ground.

As indicated by an alpha mask αM13, the effect manipulation data in the example in FIG. 11 holds data that specifies a manipulation ratio 0 for a trapezoidal region centered about the torso part indicated by a thick line, and specifies a manipulation ratio 70 for a region hatched with oblique lines other than the trapezoidal region. Also, the manipulation method ID of the effect manipulation data specifies the manipulation method of applying a filter. A 1×1 filter for lowing brightness as indicated by a filter factor f12 is held in the filter factor, and information indicating upward orientation in the image is held in the image parameter.

In image processing based on such effect manipulation data, as indicated by an image under processing P62-1, the size, orientation, and position of the alpha mask αM13 are adjusted so that the torso part of the alpha mask αM13 is overlaid on the torso part recognized in the input image P61. Further, in accordance with the filter parameter, the alpha mask αM13 is rotated, and as indicated by an image under processing P62-2, the upper side of the alpha mask αM13 coincides with the upper side of the input image P61. That is, the orientation of the alpha mask αM13 becomes the same as the orientation of the input image P61.

With respect to the region specified by the manipulation ratio 70 of the alpha mask αM13 placed in this way, a filter for lowering brightness is applied, that is, a filter is applied in accordance with the above-described equation that is used in the case when the value of an alpha mask is α. As a result, an output image P63 applied with a filter that darkens the background while leaving the entire torso of the human is acquired.

As described above, the image manipulation engine 27 can perform a process of manipulating an image by using effect manipulation data determined by the matching engine 26, thereby outputting an output image to which an effect according to the effect manipulation data has been applied.

It should be noted that the digital camera 11 can perform image processing on an image in which a plurality of humans appear, so as to apply an effect suited to a human or humans in the image. In this case, an effect may be applied to each of the plurality of humans, or a human to whom to apply an effect may be identified in accordance with a predetermined condition so that an effect is applied to the identified human. As for the condition for identifying a human to whom to apply an effect, for example, a human at the center (a human supposed to be the main character), or a human who appears large (a human supposed to be a subject on the foreground) may be identified.

Figure 12A:
FIGS. 12A and 12B are diagrams each illustrating image processing with respect to an image in which a plurality of humans appear.

For example, as shown in FIG. 12A, in the case of an image in which three humans appear side by side, even when the respective human regions are detected, the human region detection engine 24 supplies only the human region data of the human region at the center (the human region indicated by a thick line in FIG. 12A) among those human regions to the human pose recognition engine 25, in accordance with a condition that an effect be applied to the human at the center. As a result, an effect can be applied only with respect to the human at the center.

Figure 12B:
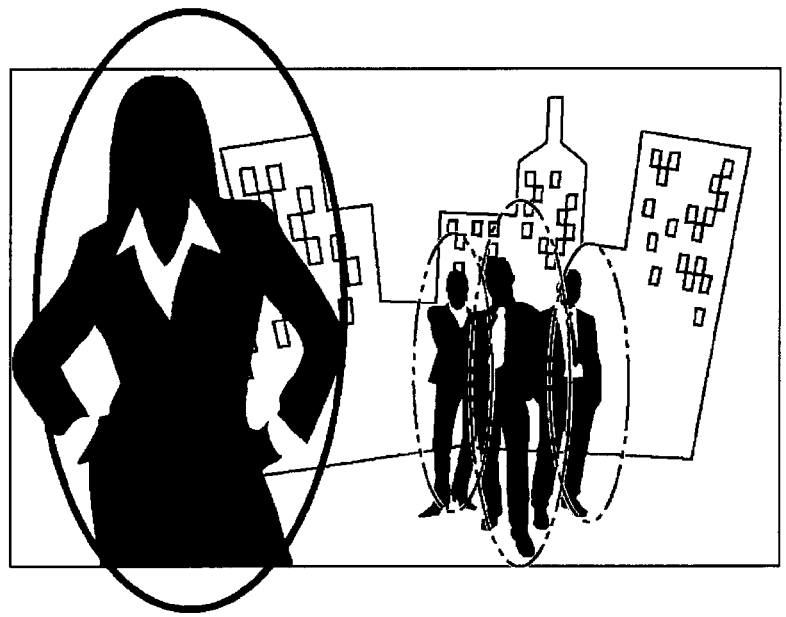

Also, as shown in FIG. 12B, in the case of an image in which a plurality of humans appear behind a human on the foreground, even when the respective human regions are detected, the human region detection engine 24 supplies only the human region data of the largest human region (the human region indicated by a thick line in FIG. 12B) of those human regions to the human pose recognition engine 25, in accordance with a condition that an effect be applied to the human who appears large. As a result, an effect can be applied only with respect to the human who appears large.

Also, the digital camera 11 can also present the user with a plurality of effects suited to a human or humans in an image, thus allowing the user to select one of those effects.

Figure 13:
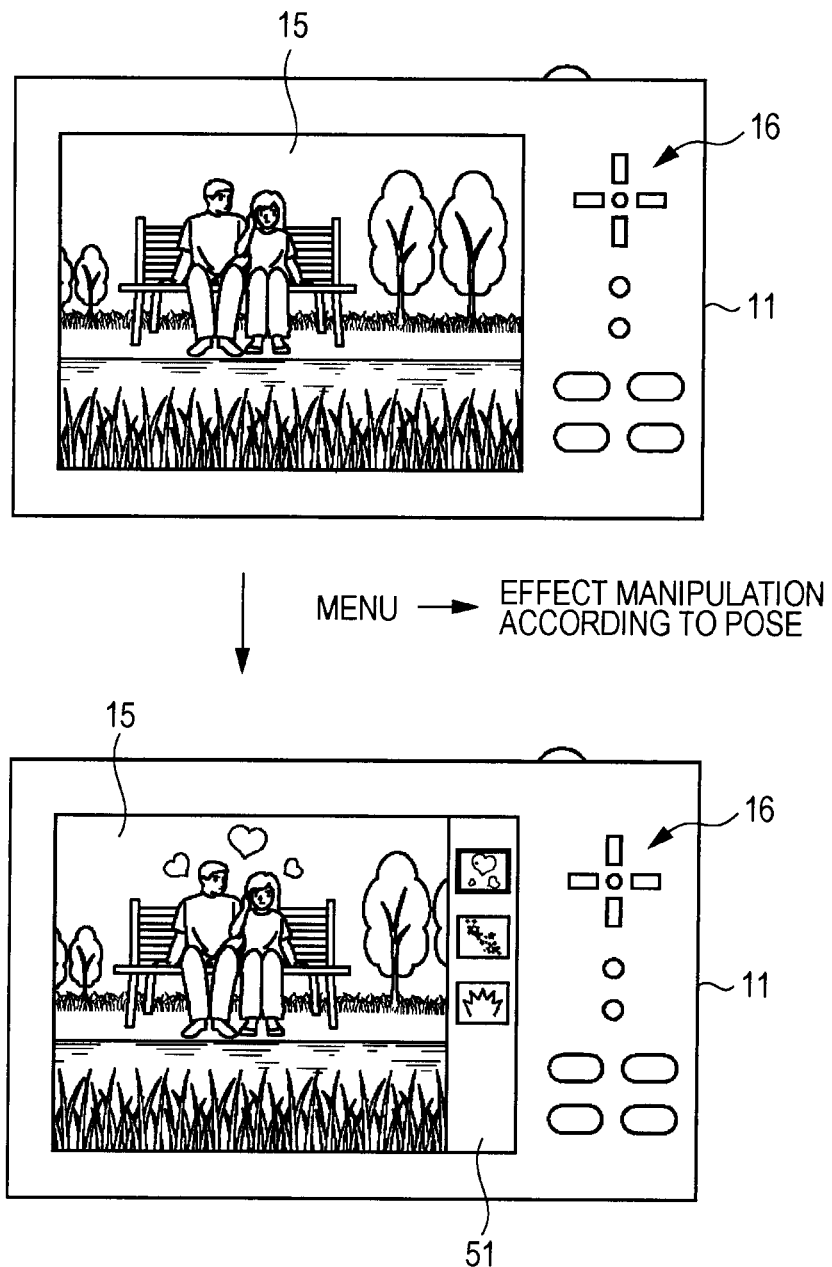
FIG. 13 is a diagram showing an example of display on a display section of a digital camera.

FIG. 13 is a diagram showing an example of display on the display section 15 of the digital camera 11.

For example, after an image subject to processing is displayed on the display section 15, the user operates the input section 16 so as to perform image processing that applies an effect suited to a human or humans in the image. At this time, for example, if there are a plurality of pieces of specific pose data each having a matching score equal to or higher than a threshold, the matching engine 26 displays icons (GUI) each representing a manipulation based on effect manipulation data associated with each of the plurality of pieces of specific pose data, on the display section 15 via the image display engine 28.

For example, if there are three pieces of specific pose data each having a matching score equal to or higher than a threshold, as shown in FIG. 13, icons representing manipulations based on three pieces of effect manipulation data are displayed at the right end of the display section 15. Then, when the user selects an icon by operating an up/down key in the input section 16, a preview of an image with an effect applied on the basis of effect manipulation data corresponding to the icon is displayed on the display section 15. Thereafter, when the user operates a Determine key of the input section 16, the preview image displayed on the display section 15 is recorded onto the recording medium 17 (FIG. 3).

It should be noted that in addition to a digital camera, an embodiment of the present invention can be applied to, for example, an image processing system including a plurality of apparatuses connected via a network.

Figure 14:
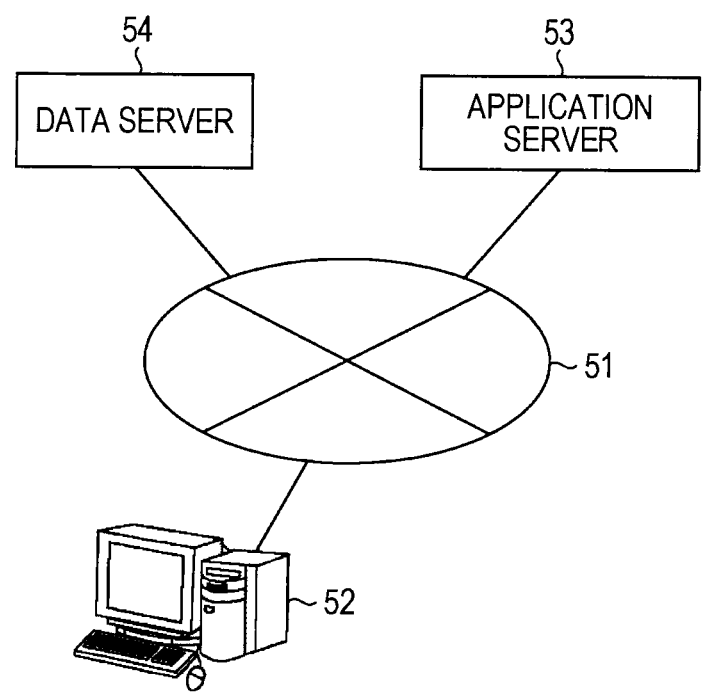
FIG. 14 is a block diagram showing an example of the configuration of an image processing system according to an embodiment of the present invention.

FIG. 14 is a block diagram showing an example of the configuration of an image processing system according to an embodiment of the present invention.

As shown in FIG. 14, the image processing system includes a personal computer 52, an application server 53, and a data server 54 which are connected via a network 51 such as the Internet or local area network.

The user operates the personal computer 52 to specify image data on which to perform image processing, and transmits a command instructing execution of image processing to the application server 53 via the network 51.

The application server 53 includes the functions of the human region detection engine 24, the human pose recognition engine 25, the matching engine 26, and the image manipulation engine 27 shown in FIG. 3. The application server 53 performs image processing on the specified image data in accordance with the command from the personal computer 52.

Like the memory 14, the data server 54 stores an effect database. The application server 53 can perform image processing by referencing the effect database stored in the data server 54. Also, the data server 54 is capable of storing an effects data in which a larger amount of data is registered than that in the memory 14, thereby allowing matching against a larger number of pieces of specific pose data.

The image data on which image processing has been performed by the application server 53 is transmitted to the personal computer 52 and presented to the user. Alternatively, such image data may be transmitted to the data server 54 and made public to other users. In addition, other than image data stored in the personal computer 52, image data accumulated in the data server 54 may be specified by the user to cause the application server 53 to execute image processing on the image data.

The series of processes described above can be either executed by hardware or executed by software. If the series of processes is to be executed by software, a program constituting the software is installed into a computer embedded in dedicated hardware, or into, for example, a general-purpose personal computer that can execute various kinds of function when installed with various kinds of program, from a program-recording medium.

Figure 15:
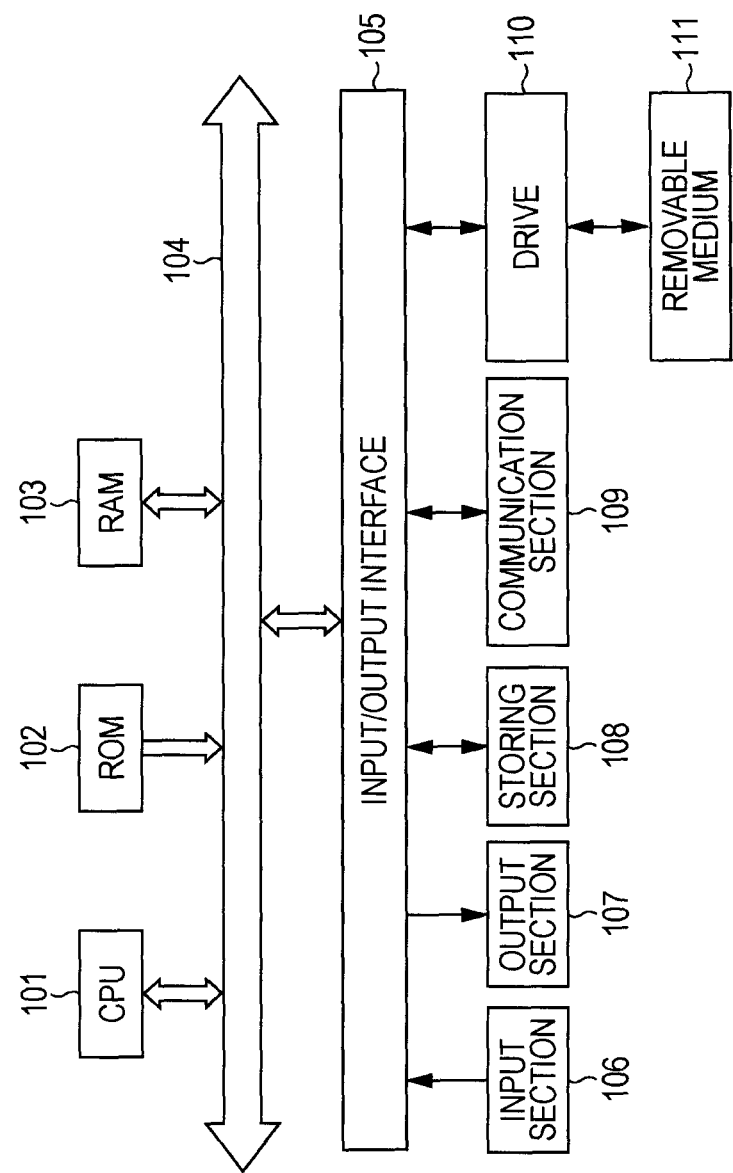
FIG. 15 is a block diagram showing an example of the configuration of a computer according to an embodiment of the present invention.

FIG. 15 is a block diagram showing an example of the hardware configuration of a computer that executes the above-described series of processes by a program.

In the computer, a CPU (Central Processing Unit) 101, a ROM (Read Only Memory) 102, and a RAM (Random Access Memory) 103 are connected to each other via a bus 104.

The bus 104 is further connected with an input/output interface 105. The input/output interface 105 is connected with an input section 106 formed by a keyboard, a mouse, a microphone, or the like, an output section 107 formed by a display, a speaker, or the like, a storing section 108 formed by a hard disk, a non-volatile memory, or the like, a communication section 109 formed by a network interface or the like, and a drive 110 for driving a removable medium 111 such as a magnetic disk, an optical disc, a magneto-optical disc, or a semiconductor memory.

In the computer configured as described above, the above-mentioned series of processes is performed when the CPU 101 loads a program stored in the storing section 108 into the RAM 103 via the input/output interface 105 and the bus 104, and executes the program, for example.

The program executed by the computer (CPU 101) is provided by being recorded on the removable medium 111 that is a package medium formed by, for example, a magnetic disk (including a flexible disk), an optical disc (such as a CD-ROM (Compact Disc-Read Only Memory) or a DVD (Digital Versatile Disc)), a magneto-optical disc, a semiconductor memory, or the like, or via a wired or wireless transmission medium such as a local area network, Internet, or digital satellite broadcast.

Then, the program can be installed into the storing section 108 via the input/output interface 105, by inserting the removable medium 111 in the drive 110. Also, the program can be received by the communication section 109 via a wired or wireless transmission medium, and installed into the storing section 108. Alternatively, the program can be pre-installed into the ROM 102 or the storing section 108.

It should be noted that the program executed by the computer may be a program in which processes are performed in time series in the order as described in this specification, or may be a program in which processes are performed in parallel or at necessary timing such as when invoked. Also, the program may be processed by a single CPU, or may be processed in a distributed manner by a plurality of CPUs.

The present application contains subject matter related to that disclosed in Japanese Priority Patent Application JP 2009-257666 filed in the Japan Patent Office on Nov. 11, 2009, the entire contents of which are hereby incorporated by reference.

An embodiment of the present invention is not limited to the above-described embodiment, but various modifications are possible without departing from the scope of the present invention.

What is claimed is:

1. An image processing system comprising:
   circuitry configured to
      store a database in which specific pose data representing a plurality of specific poses of a human, and effect manipulation data specifying a plurality of manipulations applied to an image are registered in association with each other, wherein the database classifies each one of the plurality of specific poses of the human and each one of the associated plurality of manipulations in accordance with a degree of tilt of the specific pose;
      detect a human region that is a region where a human appears in an image on which to perform image processing;
      recognize a pose and a degree of tilt of the pose of the human in the detected human region;
      represent the recognized pose of the human by positions of a plurality of parts in the detected human region of the image;
      find the specific pose data matching the degree of tilt of the recognized human pose, by referencing the classified degree of tilt of each one of the plurality of specific poses of a human registered in the database, and on the basis of a matching score, the matching score being found from a difference in position obtained for each one of the plurality of parts in the detected human region of the image from a corresponding part in the specific pose data; and
      apply one or more of the associated plurality of manipulations to the image on the basis of the registered effect manipulation data associated with the matching specific pose data according to the classified degree of tilt.

2. The image processing system according to claim 1, wherein:
   the circuitry is further configured to
      identify each one of a plurality of human regions to be processed in accordance with a predetermined condition when a plurality of humans appear in the image on which to perform image processing; and
      apply one or more manipulations to one or more of the plurality of identified human regions.

3. An image processing apparatus comprising:
   circuitry configured to
      store a database in which specific pose data representing a plurality of specific poses of a human, and effect manipulation data specifying a plurality of manipulations applied to an image are registered in association with each other, wherein the database classifies each one of the plurality of specific poses of the human and each one of the associated plurality of manipulations in accordance with a degree of tilt of the specific pose;

detect a human region that is a region where a human appears in an image on which to perform image processing;

recognize a pose and a degree of tilt of the pose of the human in the detected human region;

represent the recognized pose of the human by positions of a plurality of parts in the detected human region of the image;

find the specific pose data matching the degree of tilt of the recognized human pose, by referencing the classified degree of tilt of each one of the plurality of specific poses of a human stored in the database, and on the basis of a matching score, the matching score being found from a difference in position obtained for each one of the plurality of parts in the detected human region of the image from a corresponding part in the specific pose data; and apply at least one manipulation of the plurality of manipulations to the image on the basis of the effect manipulation data associated with the matching specific pose data according to the classified degree of tilt.

4. An image processing method comprising the steps of:

detecting a human region that is a region where a human appears in an image on which to perform image processing;

recognizing a pose and a degree of tilt of the pose of the human in the detected human region;

representing the recognized pose of the human by positions of a plurality of parts in the detected human region of the image;

finding specific pose data matching the recognized pose by referencing a database in which the specific pose data representing a plurality of specific poses of a human, and effect manipulation data specifying a plurality of manipulations applied to an image are registered in association with each other, the database being stored in a non-transitory computer-readable storage medium, wherein the database classifies each one of the plurality of specific poses of the human and each one of the associated plurality of manipulations in accordance with a degree of tilt of the specific pose and referencing the database comprises referencing the degree of tilt of each one of the plurality of specific poses, and wherein finding the specific pose data is further based on a matching score, the matching score being found from a difference in position obtained for each one of the plurality of parts in the detected human region of the image from a corresponding part in the specific pose data; and applying a manipulation selected from the plurality of manipulations to the image on the basis of the effect manipulation data associated with the found specific pose data according to the classified degree of tilt, wherein detecting the human region, recognizing the human pose, finding the specific pose data, and applying the manipulation are performed by one or more processors.

5. A non-transitory computer-readable storage medium having embodied thereon a program, which when executed by a computer causes the computer to execute an image processing method, the method comprising:

detecting a human region that is a region where a human appears in an image on which to perform image processing;

recognizing a pose and a degree of tilt of the pose of the human in the detected human region;

representing the recognized pose of the human by positions of a plurality of parts in the detected human region of the image;

finding specific pose data matching the recognized pose by referencing a database in which the specific pose data representing a plurality of specific poses of a human, and effect manipulation data specifying a plurality of manipulations applied to an image are registered in association with each other, the database being stored in the non-transitory computer-readable storage medium, wherein the database classifies each one of the plurality of specific poses of the human and each one of the associated plurality of manipulations in accordance with a degree of tilt of the specific pose and referencing the database comprises referencing the degree of tilt of each one of the plurality of specific poses, and wherein finding the specific pose data is further based on a matching score, the matching score being found from a difference in position obtained for each one of the plurality of parts in the detected human region of the image from a corresponding part in the specific pose data; and applying a manipulation to the image on the basis of the effect manipulation data associated with the found specific pose data according to the classified degree of tilt.

6. An image processing system comprising:

a storing section that stores a database in which specific pose data representing a plurality of specific poses of a human, and effect manipulation data specifying a plurality of manipulations applied to an image are registered in association with each other, wherein the database classifies each one of the plurality of specific poses of the human and each one of the associated plurality of manipulations in accordance with a degree of tilt of the specific pose;

a human region detecting section that detects a human region that is a region where a human appears in an image on which to perform image processing;

a human pose recognizing section that recognizes a pose and a degree of tilt of the pose of the human in the human region detected by the human region detecting section;

a recognized pose representation section that represents the recognized pose of the human by positions of a plurality of parts in the detected human region of the image;

a matching section that finds the specific pose data matching the pose recognized by the human pose recognizing section, by referencing the classified degree of tilt of each one of the plurality of specific poses of the human registered in the database stored in the storing section, and on the basis of a matching score, the matching score being found from a difference in position obtained for each one of the plurality of parts in the detected human region of the image from a corresponding part in the specific pose data; and a manipulating section that applies one or more of the plurality of manipulations to the image on the basis of the effect manipulation data associated with the specific pose data found by the matching section, according to the classified degree of tilt, wherein the storing section, the human region detecting section, the human pose recognizing section, the recognized pose representation section, the matching section, and the manipulating section are each implemented via at least one processor.

7. An image processing apparatus comprising:

a storing section having a non-transitory computer-readable medium that stores a database in which specific pose data representing a plurality of specific poses of a human, and effect manipulation data specifying a plurality of manipulations applied to an image are registered in association with each other, wherein the database classifies each one of the plurality of specific poses of the human and each one of the associated plurality of manipulations in accordance with a degree of tilt of the specific pose;

a human region detecting section that detects a human region that is a region where a human appears in an image on which to perform image processing;

a human pose recognizing section that recognizes a pose and a degree of tilt of the pose of the human in the human region detected by the human region detecting section;

a recognized pose representation section that represents the recognized pose of the human by positions of a plurality of parts in the detected human region of the image;

a matching section that finds the specific pose data matching the pose recognized by the human pose recognizing section, by referencing the classified degree of tilt of each one of the plurality of specific poses of the human registered in the database stored in the storing section, and on the basis of a matching score, the matching score being found from a difference in position obtained for each one of the plurality of parts in the detected human region of the image from a corresponding part in the specific pose data; and a manipulating section that applies a manipulation to the image on the basis of the effect manipulation data associated with the specific pose data found by the matching section, according to the classified degree of tilt, wherein the storing section, the human region detecting section, the human pose recognizing section, the recognized pose representation section, the matching section, and the manipulating section are each implemented via at least one processor.

* * * * *